United States Patent
Ding et al.

(10) Patent No.: US 10,120,899 B2
(45) Date of Patent: Nov. 6, 2018

(54) SELECTIVE MATERIALIZED VIEW REFRESH

(71) Applicant: Oracle International Corporation, Redwood Shores, CA (US)

(72) Inventors: Luping Ding, Westford, NH (US); Tsae-Feng Yu, Westford, NH (US)

(73) Assignee: Oracle International Corporation, Redwood Shores, CA (US)

( * ) Notice: Subject to any disclaimer, the term of this patent is extended or adjusted under 35 U.S.C. 154(b) by 164 days.

(21) Appl. No.: 13/826,501

(22) Filed: Mar. 14, 2013

(65) Prior Publication Data

US 2014/0280028 A1 Sep. 18, 2014

(51) Int. Cl.
*G06F 17/30* (2006.01)

(52) U.S. Cl.
CPC .. *G06F 17/30457* (2013.01); *G06F 17/30383* (2013.01)

(58) Field of Classification Search
CPC ................................................. G06F 17/30383
USPC ........................................................ 707/717
See application file for complete search history.

(56) References Cited

U.S. PATENT DOCUMENTS

| | | | |
|---|---|---|---|
| 6,581,205 B1 | 6/2003 | Cochrane et al. | |
| 6,965,899 B1 | 11/2005 | Subramaniam et al. | |
| 7,734,602 B2 * | 6/2010 | Folkert et al. | 707/696 |
| 2004/0122828 A1 * | 6/2004 | Sidle et al. | 707/100 |
| 2004/0225666 A1 * | 11/2004 | Hinshaw | G06F 17/30383 |
| 2006/0122964 A1 | 6/2006 | Yu et al. | |
| 2006/0253483 A1 * | 11/2006 | Yu | 707/101 |
| 2007/0226203 A1 | 9/2007 | Adya et al. | |
| 2009/0037462 A1 | 2/2009 | Pearson et al. | |
| 2009/0182779 A1 * | 7/2009 | Johnson | 707/200 |
| 2009/0319476 A1 * | 12/2009 | Olston et al. | 707/2 |
| 2010/0332526 A1 | 12/2010 | Nori | |
| 2011/0106790 A1 * | 5/2011 | Gupta et al. | 707/717 |

(Continued)

OTHER PUBLICATIONS

Oracle Database Data Warehousing Guide 10g Release 2 (10.2), retrieved from archive.org on Dec. 28, 2011-Feb. 4, 2012, https://web.archive.org/web/20111229154246/http://docs.oracle.com/cd/B19306_01/server.102/b14223/toc.htm.*

(Continued)

*Primary Examiner* — Brittany N Allen
(74) *Attorney, Agent, or Firm* — Hickman Palermo Becker Bingham LLP; Daniel D. Ledesma

(57) ABSTRACT

Techniques are provided for selectively refreshing a materialized view. A portion of a materialized view is refreshed (or updated) while other portions of the materialized view are not refreshed. Thus, the other portions of the materialized view may contain "stale" data that does not accurately reflect current data in the base table(s) upon which the materialized view is based. In one technique, a user indicates the portion of the materialized view that is to be refreshed. In another technique, a user indicates a plurality of portions of a materialized view and it is automatically determined which portion should be refreshed first. Change data that indicates information about changes made to different portions of one or more base tables and/or read data that indicates information about reads to different portions of the materialized view may be taken into account to determine which portion of a materialized view to refresh.

21 Claims, 4 Drawing Sheets

(56) References Cited

U.S. PATENT DOCUMENTS

| | | | |
|---|---|---|---|
| 2012/0030192 A1* | 2/2012 | An | G06F 17/30587 707/717 |
| 2012/0131589 A1* | 5/2012 | Golab et al. | 718/104 |
| 2013/0007069 A1* | 1/2013 | Chaliparambil | G06Q 10/10 707/803 |

OTHER PUBLICATIONS

The Arup Nanda Blog, Online Materialized View Complete Refresh with Partitions, Apr. 4, 2010.*

Jonathan Lewis, MV Refresh, Oracle Scratchpad, Sep. 11, 2013.*

Randall B. Bello et al, "Materialized Views in Oracle", Proceedings of the 24th International Conference on Very Large Databases, Aug. 24-27, 1998, pp. 659-664.

Burt L. Vialpando et al., "Comparing DB2 materialized query tables and Oracle materialized views" http://www.ibm.com/developerworks/data/library/techarticle/dm-0708khatri/, dated 2007, 20 pages.

Petrus Chan, "A First Look at Materialized Query Table (MQT) in DB2 LUW", IBM Software Group, technical slides, 2009, 44 pages.

Eric Hanson et al., "Improving Performance with SQL Server 2008 Indexed Views", SQL Server Technical Article, Oct. 2008, 30 pages.

Grace Au et al., "Introduction to Materialized Views in Teradata", 541-0003506B01, Oct. 25, 2002, 31 pages.

Jose A. Blakeley et al., "Efficiently Updating Materialized Views", Proceedings of the 1986 ACM SIGMOD international conference on Management of data, May 28-30, 1986, pp. 61-71.

Latha S. Colby et al., "Algorithms for Deferred View Maintenance", Proceedings of the 1996 ACM SIGMOD international conference on Management of data, Jun. 4-6, 1996, pp. 469-480.

Yue Zhuge et al., "View Maintenance in a Warehousing Environment", Proceedings of the 1995 ACM SIGMOD international conference on Management of data, May 22-25, 1995, pp. 316-327.

Oracle® Database Data Warehousing Guide 11g Release 2 (11.2) E10810-01, http://docs.oracle.com/cd/E14072_01/server.112/e10810.pdf, Aug. 2009, Chapters 8, 9 and 15, 93 pages.

"Is it possible to partially refresh a materialized view in Oracle?" retrieved Apr. 9, 2013 from < http://stackoverflow.com/questions/1783308/is-it-possible-to-partially-refresh-a-materialize . . . > 2009, 2 pages.

"Oracle: Oracle release—9i and earlier—Partial refresh of partitioned materialized view?" Tecumseh Group, Inc. received on Apr. 9, 2013 from < http://www.tek-tips.com/viewthread.cfm?qid=826309 > 1998-2013, 1 page.

"Partial Mview refresh—dBforums" Jelsoft Enterprises Ltd., downloaded Apr. 9, 2013 from < http://ww.dbforums.com/oracle/1618356-partial-mview-refresh.html > 2000-2013, 3 pages.

U.S. Appl. No. 13/826,726, filed Mar. 14, 2013, Notice of Allowance, dated Jun. 30, 2016.

* cited by examiner

SELECTIVE MATERIALIZED VIEW REFRESH

CROSS-REFERENCE TO RELATED APPLICATIONS

This application is related to U.S. patent application Ser. No. 13/826,726 filed Mar. 14, 2013, the entire contents of which is hereby incorporated by reference for all purposes as if fully set forth herein.

FIELD

Embodiments generally relate to updating a materialized view and, more specifically, to selectively updating a materialized view.

BACKGROUND

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Embodiments are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it is not desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

A view is defined by metadata referred to as a view definition. The view definition contains mappings to one or more columns in the one or more tables containing the data. Columns and tables that are mapped to a view are referred to herein as base columns and base tables of the view, respectively.

Typically, the view definition is in the form of a database query. These queries, like any database query, must conform to the rules of a particular query language such as the ANSI Structured Query Language (SQL).

The data presented by conventional views is gathered and derived on-the-fly from the base tables in response to queries that access the views. The data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate from the one or more base table from which the data was originally gathered and derived. The data contained in a materialized view is referred to herein as "materialized data." A materialized view eliminates the overhead associated with gathering and deriving materialized data every time a query accesses the materialized view.

When a materialized view is initially created, it is "fresh," meaning the content of the materialized view is in sync with one or more base tables on which the materialized view is based. In response to a database update operation to one of the base table(s), such as an insert, delete, or update, one or more rows of the base table are affected. Once the transaction in which the operation is performed is committed, the materialized view becomes "stale" because the affected rows (whether newly inserted, updated, or deleted) are not counted in the materialized view. Once a materialized view becomes stale, the materialized view cannot be used to answer a query, unless the session in which the query is submitted operates in a "stale tolerance" mode. The materialized view must be updated or "refreshed" in order to bring the materialized view up to date. However, current approaches to refreshing a materialized fresh typically take a significant amount of computer resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
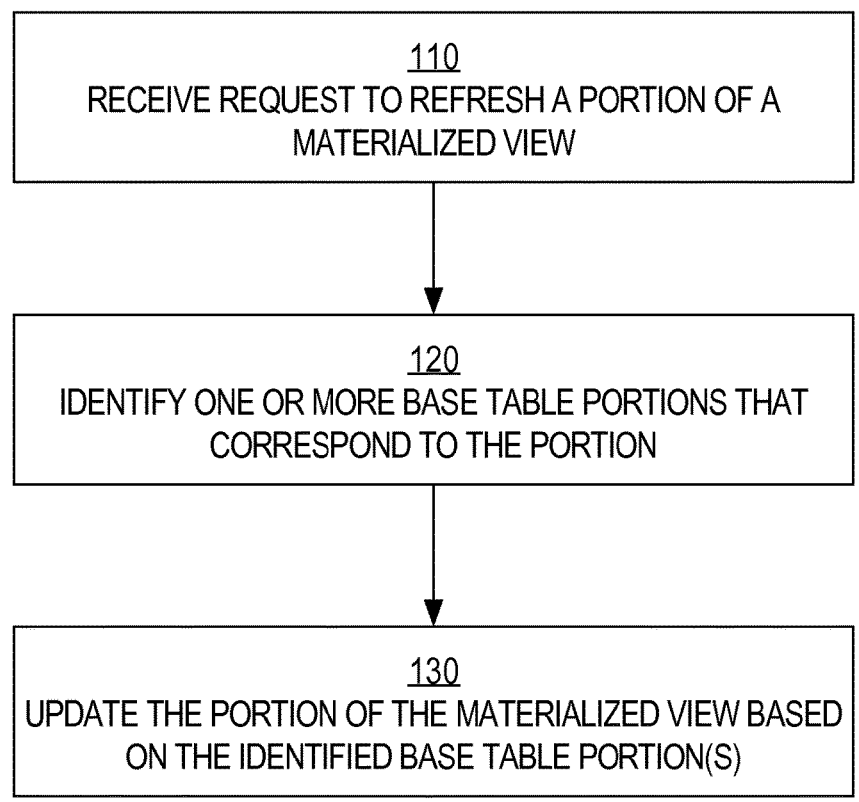
FIG. 1 is an example process for performing an update of a materialized view based on input from a user, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for refreshing (or updating) a materialized view. Instead of refreshing the entirety of the materialized view, only a portion of the materialized view is refreshed, even if other portions of the materialized view are stale. This type of refresh is referred to herein as a "selective refresh." The portion may be determined based on input from a user, such as a database administrator. Alternatively, the portion may be determined based on change data associated with different portions of the materialized view.

In one approach, during a refresh of a materialized view, different portions of the materialized view are refreshed using different refresh techniques.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Logical Partitions

A "portion" of a base table or a materialized view is either a partition or a subset of the table or view, such as a set of rows.

In the embodiment where a portion is a partition, the partition is either a physical partition or a "logical partition." A physical partition is a partition that is based on a database statement (e.g., a DDL statement) that, when processed, causes a table (or materialized view) to be partitioned. Such a database statement typically also specifies columns of the table (or materialized view) that is to be created based on the database statement. A physical partition may have its own physical properties, such as a tablespace in which the physical partition is stored, compression options, and storage options. An example of a DDL statement that creates a partitioned table and an example of a DDL statement that creates a partitioned materialized view are as follows:

```
CREATE TABLE lineitem (
    l_shipdate not null,
    l_orderkey not null,
    ...)
```

```
partition by range (l_shipdate)
    (partition item01 values less than (to_date('1992-01-01')),
    partition item02 values less than (to_date('1992-02-01')),
    ...
    partition item89 values less than (to_date('1999-05-01')),
    partition itemmax values less than (maxvalue));
CREATE MATERIALIZED VIEW mav_q1 (
    partition by range (l_shipdate)
        (partition item01 values less than (to_date('1992-01-01')),
        partition item02 values less than (to_date('1992-02-01')),
        ...
        partition item89 values less than (to_date('1999-05-01')),
        partition itemmax values less than (maxvalue))
AS
    SELECT l_shipdate, l_linestatus, sum(l_quantity) as sum_qty,
        count(l_quantity) as count_qty, count(*) as count_star
    from lineitem
    group by l_shipdate, l_linestatus;
```

In contrast, a "logical partition" is a partition that is not based on a database statement that causes a table to be partitioned. Logical partitions may be defined in a similar way as physical partitions, except that the instruction to create the logical partitions includes data that indicates that the resulting partitions are "logical" rather than "physical." Alternatively, a logical partition may be specified by a user as part of a refresh statement that instructs a computer system (e.g., a database server) to perform a refresh operation.

Given the above example materialized view, a logical partition of the materialized view 'mav_q1' based on years may be specified by the following predicate in a DDL statement:

```
logical partition by range (l_shipdate)
    (partition item01 values less than (to_date('1992-01-01',)),
    partition item02 values less than (to_date('1993-01-01',)),
    ...
    partition item08 values less than (to_date('1999-01-01',)),
``` whereas the (physical) partitions of the base table 'lineitem' and the materialize view 'mav_q1' are based on calendar months. As another example, a predicate of a logical partition may be based on an entirely different key or column than the key or column upon which the materialized view or table partitions are based. For example, if one of the columns of the base table lineitem' is destination country, then a predicate of three logical partitions may be the following:

```
logical partition by distinct value (l_dest_country)
    (partition item01 = ('China'),
    partition item02 = ('US'),
    partition item03 = ('Brazil')),
```

A logical partition may be defined by more complex predicates than physical partition definitions. Compared to physical partitions, logical partitions are more lightweight and easier to manage because a change to a logical partition scheme only involves a metadata change for partition boundaries. In contrast, a change to a physical partition scheme involves data movement, such as moving every row in an affected partition, which is very expensive. Logical partitions are not affected by physical partition changes because a logical partition only defines a scope of data and is not "physically" associated with data, such as storage location. Also, as opposed to physical partitions, changing the definition of logical partitions does not require a materialized view refresh or recreation.

In an embodiment, a table (e.g., base table or materialized view container table) may be partitioned both physically and logically. In other words, logical partitions and physical partitions can co-exist for the same table.

Materialized View Portion Identified by User

FIG. 1 is an example process 100 for performing an update of a materialized view based on input from a user, in an embodiment.

At block 110, input that requests a refresh operation to be performed with respect to a materialized view is received. The input may or may not indicate a particular portion of the materialized view. For example, the input may be "REFRESH MV1," where "MV1" is a materialized view. As another example, the user input may be "REFRESH MVP3," wherein MVP3 is a partition of the materialized view MV.

Figure 2:
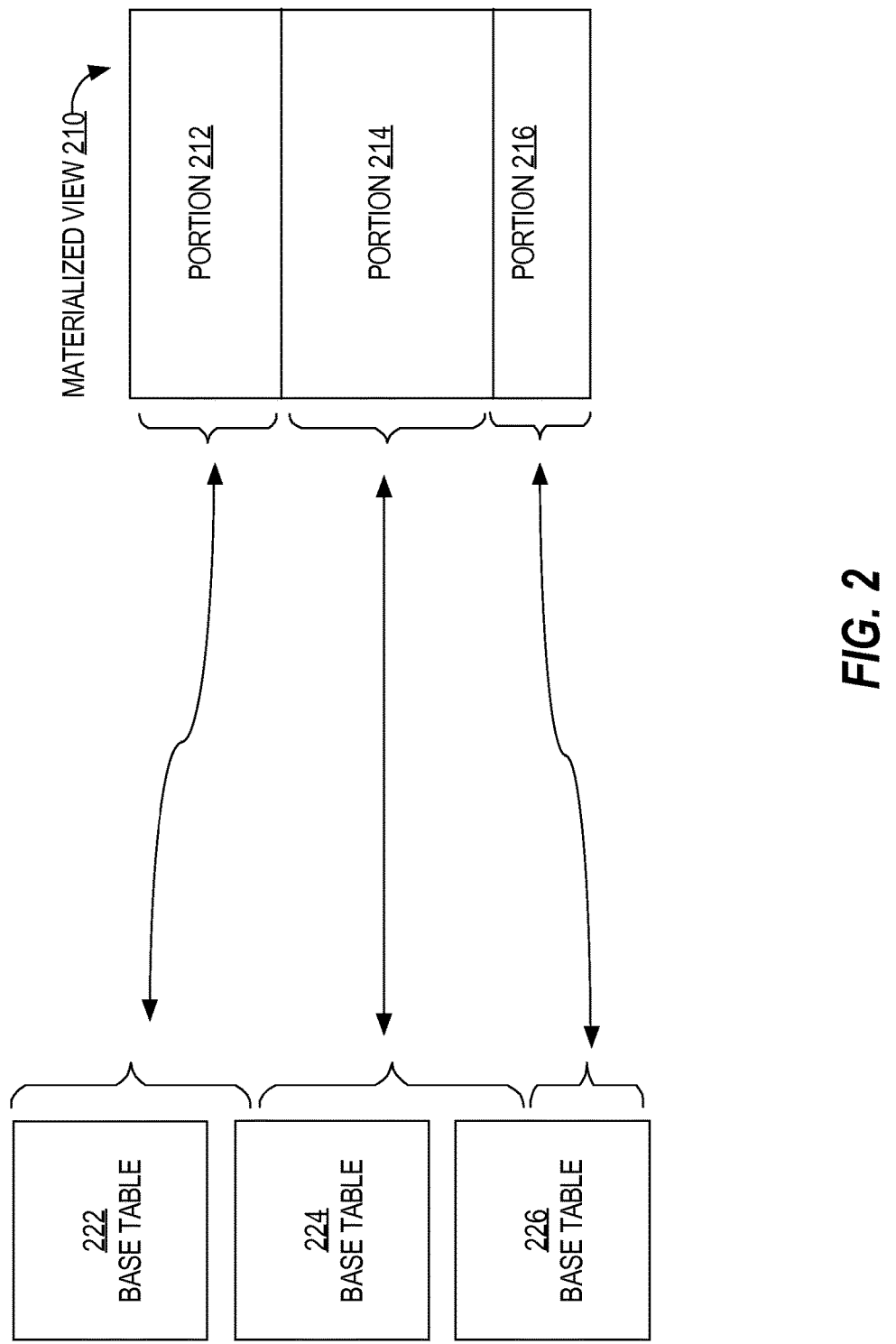
FIG. 2 is a block diagram that depicts a materialized view that is based on multiple base tables, in an embodiment.

The following are examples of refresh statements that may be specified by a user, such as a database administrator (DBA). In this first example, partitions p9 and p10 of materialized view (MV) labeled 'store_id_sales_mv' are specified for refreshing:

execute dbms_mview.refresh('store_id_sales_mv', 'f', partition=>'(p9, p10)');

In this second example, partitions p9 and p10 of MV 'store_id_sales_mv' and partitions p3 and p4 of MV 'area_sales_mv' are specified for refreshing:

execute dbms_mview.refresh('store_id_sales_mv, area_sales_mv', 'ff', partition=>'(p9, p10), (P3,P4)');

In this third example, partitions of all materialized views that depend on partition p8 of base table 'store' are specified for refreshing:

execute dbms_mview.refresh_dependent('store', 'f', partition=>'(p8)');

In this fourth example, partitions p3 and p4 of MV 'store_id_sales_mv' and partitions p9 and p10 of MV 'area_sales_mv' that are dependent on partition p8 of table 'store' are specified for refreshing:

execute dbms_mview.refresh_dependent('store', 'f', partition=>'(p8)', mv=>'store_id_sales_mv, area_sales_mv', mvpartition=>'(p3, p4), (p9, p10)');

The following is an example of a predicate-based refresh:

execute dbms_mview.refresh('store_id_sales_mv', 'f', tabpred=>'store_key='FK01'');

FIG. 2 is a block diagram that depicts a materialized view 210 that is based on base tables 222, 224, and 226, in an embodiment. Materialized view 210 comprises three portions: materialized view (MV) portions 212, 214, and 216. MV portions 212-216 may correspond to different physical partitions of materialized view 210. Alternatively, MV portions 212-216 may correspond to different logical partitions of materialized view 210. Alternatively, each of MV portions 212-216 comprises a set of data (e.g., rows) that do not belong to a physical or logical partition, such as the first third of rows of materialized view 210. However, such a portion may be considered a type of logical partition.

MV portion 212 corresponds to base table 222 and a portion of base table 224. In other words, MV portion 212 comprises data that originates from base table 222 and a certain portion of base table 224. MV portion 214 corresponds to a portion of base tables 224 and 226 and MV portion 216 corresponds to a portion of base table 226.

Returning to FIG. 1 in light of the example of FIG. 2, the input may indicate MV portion 212.

At block 120, one or more portions of one or more base tables that correspond to the materialized view are identified. Such portions are referred to herein as "one or more base table portions." As indicated previously, a base table portion may be a partition or some other subset of a base table. Portions of a base table may contain the same amount of data (or the same number of rows) relative to each other or may contain different amounts of data (or different number of rows) relative to each other. For example, if base table portions are partitions or are otherwise based on different predicates, then each base table portion may contain a different amount of data. If base table portions are identified based on size (such as a base table being divided into thirds based on size), then the base table portions may contain the same (or nearly the same) amount of data.

If the input in block 110 indicated a particular portion of the materialized view, then the base table portion(s) are identified based on the particular portion. For example, if MV1P3 was specified in user input and MV1P3 is mapped to base table partitions BT1P5 and BT1P6, then BT1P5 and BT1P6 are identified. Block 120 is performed if the base table portion(s) are derivable based on the particular portion of the materialized view.

As another example, in FIG. 2, if the input in block 110 indicates portion MV 212, then it is determined that the entirety of base table 222 corresponds to portion 212 and that a certain portion of base table 224 corresponds to MV portion 212.

If the input in block 110 did not indicate a particular portion of the materialized view, then it is determined which portion of the materialized view should be updated or refreshed. This determination is made based on one or more criteria. Examples of criteria include "change data" that includes information about changes that have been made to different base table portions and "read data" that includes information about the number or frequency of reads to different materialized view portions. For example, if a particular base table portion has changed the most relative to other base table portions, then the particular base table portion is identified in block 120. Both "change data" and "read data" are described in more detail below.

At block 130, a portion of the materialized view is updated based on the identified base table portion(s). The portion of the materialized view is less than all of the materialized view. While the portion of the materialized view is updated as part of a refresh operation, other portions of the materialized view are not updated as part of the refresh operation. Thus, the other portions may be stale, or rather, may contain data that is not in sync with the base table(s) upon which the materialized view is based.

In the example of FIG. 2, if the input in block 110 indicated MV portion 212, then only MV portion 212 is refreshed without refreshing MV portions 214 and 216. In other words, MV portions 214 and 216 remain "un-refreshed."

One benefit of selective materialized view refresh is that the refreshed portion of the materialized view is available for query rewrite and direct access sooner than if query processing had to wait until after the entirety of the materialized view was refreshed. Refreshing a small portion of a materialized view may take a few minutes to complete while refreshing the entirety of the materialized view may take hours to complete.

Materialized View Portion Identified Automatically

Figure 3:
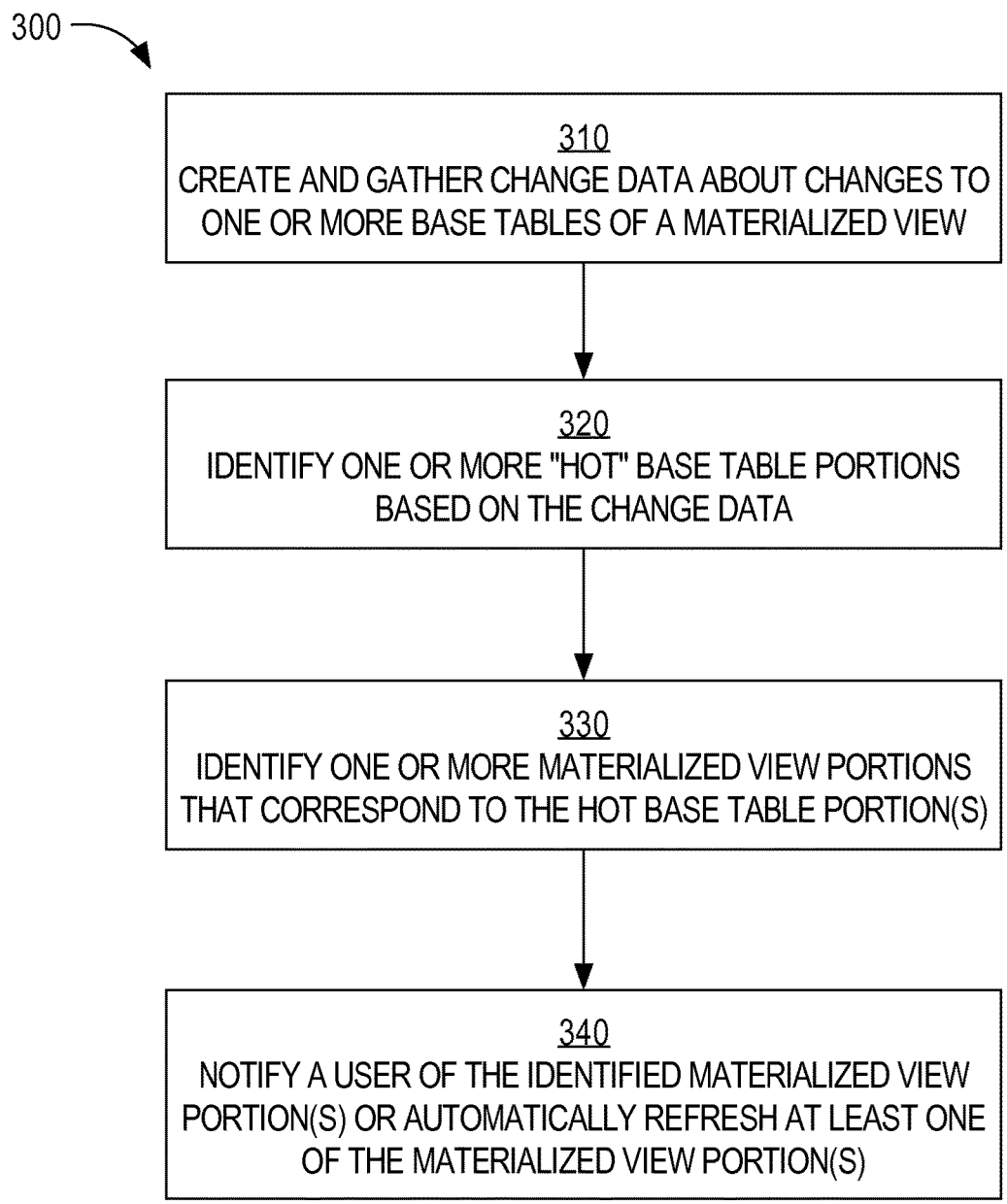
FIG. 3 is an example process for performing an update of a materialized view based on change information, in an embodiment.

FIG. 3 is an example process 300 for performing an update of a materialized view based on change information, in an embodiment.

At block 310, change data is created. "Change data" is data that indicates information about changes that have been made to one or more base tables upon which the materialized view is based. The changes may include insertion, updates, and deletions, such as to specific rows, sections, or partitions of the one or more base tables. Alternatively, change data may indicate information about which portions of the materialized view correspond to portions of the one or more base tables that have changed.

An example of change data is an indication that at least one change occurred to a base table. Such change data may be implemented as a Boolean value or a single bit.

Another example of change data is an indication of a number of changes that have occurred to a base table since a most recent refresh of the materialized view. Change data may reflect change information at different levels of granularity. For example, change data may indicate that 23 changes have occurred to base table BT1 and that 14 changes have occurred to base table BT2. As another example, change data may indicate that 12 changes have occurred to base table partition BT1P1 and that five changes have occurred to base table partition BT1P2. As another example, change data may indicate that 18 changes have occurred to the first half of base table BT1 (where BT1 is not partitioned) and that two changes have occurred to the second half of BT1.

Another example of change data is an indication of a number of data items (e.g., rows) in the one or more base tables that were changed since a most recent refresh of the materialized view. For example, change data may indicate that only one row in base table BT1 has changed even though 98 changes have been made to that row since the most recent refresh of the materialized view. As another example, change data may indicate that only three rows in base table partition BT1P1 has changed even though the total number of changes to that partition is over a hundred.

While the above examples are regarding changes that have occurred since a most recent refresh of the materialized view, change data may additionally, or alternatively, indicate information about changes that have occurred during a different time period, such as in the last ten minutes, twelve hours, or five days.

A base table portion that is associated with change data that indicates relatively many changes (e.g., since the last materialized view refresh or within a certain period of time) is referred to herein as a "hot" base table portion (or simply "hot portion"). Conversely, a base table portion that is associated with change data that indicates relatively few changes is referred to herein as a "cold" base table portion (or simply "cold portion").

In an embodiment, in addition to tracking change data, a computer system (e.g., a database server) may also track read data for multiple portions of a materialized view. Read data includes information about reads to different portions of the materialized view. For example, read data may indicate that a particular materialized view partition has been read at least once within, for example, the last 24 hours or since the most recent refresh of the particular partition.

As another example, read data for a materialized view portion may indicate a number of times data from that portion was requested for reading in order to process a (e.g., re-written) query. For example, change data for base table portion BTP2 may indicate that a hundred changes have occurred to BTP2 since the most recent refresh of materialized view portion MVP4 that corresponds to BTP2. However, read data for MVP4 may indicate that only one read has been made to MVP4 since the most recent refresh of MVP4.

As another example, read data for a materialized view portion may indicate a number of data items within the portion that have been read within a particular time period, such as since the most recent refresh of the portion. For example, read data for materialized view partition MVP5 may indicate that two rows from MVP5 have been read in the last two days, even though the two rows have been read over a hundred times in that time period.

A materialized view portion that is associated with read data that indicates relatively many read accesses is referred to herein as a "hot" materialized view portion. Conversely, a materialized view portion that is associated with read data that indicates relatively few read accesses is referred to herein as a "cold" materialized view portion.

At block 320, one or more hot base table portions are identified based on the change data. Different criteria may be used to identify the one or more hot base table portions. For example, the portion that has been affected by the most changes that have occurred since the most recent refreshed is identified. As another example, the portion that is affected by the most changes that have occurred in a certain period of time is identified.

The hot portion(s) may be of varying granularity. For example, a hot portion may be a partition. As another example, a hot portion may be a set of rows in the base table. The set of rows may be contiguous rows or may be rows that satisfy a particular predicate. In an embodiment, if multiple hot base table portions are identified, one hot portion may be of one level of granularity while another hot portion may be of another level of granularity. For example, one hot portion may be a base table partition while another hot portion may be a set of rows that do not comprise a base table partition.

Block 320 may be performed in response to determining that the change data associated with a base table portion satisfies one or more criteria. For example, if the change data associated with a portion of a base table indicates that a certain number of changes that have occurred to the portion exceed a particular threshold, then that portion is identified as "hot." As another example, if the change data associated with a base table portion indicates that certain number of data items (e.g., rows) in the base table portion have changed exceed a certain threshold, then that portion is identified at "hot."

The determination of whether change data associated with a base table portion satisfies one or more criteria may be performed, for example, continuously, periodically, or in response to certain events.

Alternatively, block 320 may be performed in response to receiving user input that indicates a request for read information about different portions of a materialized view and/or change information about one or more base tables upon which the materialized view is based. In this way, a user may dictate when s/he desires to view which portions of a materialized view are "hot" or which base table portions are "hot."

In an embodiment, the identification of hot base table portion(s) in block 320 may also take into account read data that is associated with materialized view portion(s) that correspond to the identified hot base table portion(s). For example, change data for base table portion BTP2 may indicate that a hundred changes have occurred to BTP2 since the most recent refresh of materialized view portion MVP4 that corresponds to BTP2. Change data for base table portion BTP3 may indicate that twenty changes have occurred to BTP3 since the most recent refresh of materialized view portion MVP6 that corresponds to BTP3. However, read data for MVP4 may indicate that only one read has been made to MVP4 since the most recent refresh of MVP4. Also, read data for MVP6 may indicate that thirty reads have been made to MVP6 since the most recent refresh of MVP6. Thus, due to the higher read frequency count of MVP6 relative to MVP4, MVP6 may be considered the better candidate for refresh than MVP4 even though BTP2 that corresponds to MVP4 is "hotter" than BTP3, which corresponds to MVP6.

At block 330, one or more portions of the materialized view are identified based on the identified hot base table portion(s) and, optionally, read data of the one or more materialized view portions. The identified portions may be any granularity of the materialized view. For example, a portion of the materialized view may be two partitions that correspond to one or more base table partitions identified in block 320. As another example, a portion of the materialized view may be a set of data that corresponds to a predicate (e.g., where the materialized view is not partitioned) or a set of data that does not correspond to a predicate (e.g., rows 3, 9, and 58 of the materialized view).

Block 330 is performed if a portion of the materialized view is derivable from the identified hot base table portion(s). If not, then process 300 may return to block 310.

At block 340, a notification is sent or communicated to a user. The notification informs a user (e.g., a database administrator) regarding the portion of the materialized view that is considered the best candidate for performing a refresh. The materialized view portion may be affected by the most changes to the base table(s) or may be considered the "hottest" view portion relative to other portions of the materialized view. With this information, the user is able to determine which portion of the materialized view should be refreshed first. If the portion is a physical partition of the materialized view, then the notification may identify the partition. If the portion is a logical partition, then the notification may identify a predicate that "covers" the logical partition. A predicate may identify a range of values, a list of one or more discrete values, or both. If the portion is neither a physical partition nor a logical partition, then the notification may identify the portion in some other manner, such as identifying which rows of the materialized view should be refreshed.

Additionally, the notification may list a number of portions of the materialized view. In this embodiment, the list of portions may indicate change data and/or read data associated with each listed portion.

In an alternative embodiment, block 340 involves automatically performing a refresh of the identified portion(s) of the materialized view without waiting for user input. Such a refresh is referred to herein as an "anticipatory refresh."

Prioritizing Materialized View Portions

In an embodiment, a user submits a request to view information about multiple portions of a materialized view. The request may specify the multiple portions, such as MVP2, MVP3, and MVP5. In response, a computer system (e.g., a database server) uses change data to order (e.g., visually) the specified portions. For example, a database server determines which of MVP2, MVP3, or MVP5 is associated with the "hottest" base table portion(s) and then causes order information to be displayed (e.g., to a database administrator) regarding MVP2, MVP3, and MVP5.

In a related embodiment, the computer system provides information about one or more portions of the materialized view that are not specified in the user request. For example, the request may not specify any portion of a materialized view. Instead, the request is for information about the "best" portions of the materialized view to refresh. In response, the computer system uses change data and/or read data to identify materialized view portions MVP2 and MVP4 as being associated with the "hottest" base table portion(s) or as being the "hottest" materialized view portions. As another example, the request may specify materialized view portion MVP2 and the computer system, in response, uses change data and/or read data to identify materialized view portions MVP4 and MVP5 as being "hotter" than MVP2 or as being associated with "hotter" base table portion(s) than the base table portion(s) that are associated with MVP2.

Queries that Target Different Portions of a Materialized View

After a selective materialized view refresh, a materialized view may contain fresh data and stale data. In other words, the materialized view contains different sets of data that were current at different points in time. The different points in time may correspond to different snapshots of a database. Such a materialized view is referred to as an "irregular materialized view." A query against irregular materialized views may be prohibited if the query is only allowed to "see" data that was current at a particular point of time.

For example, if the materialized view is partitioned into partitions MVP1, MVP2, and MVP3, each of which was refreshed at different points in time, and a query requires data from MVP2 and MVP3, the query might not be allowed to use MVP2 and MVP3. Instead, the query may be modified to identify one or more base table portions that correspond to MVP2 and MVP3.

In an embodiment, a query compiler or optimizer determines which portions of a materialized view are required for a query. If the query optimizer identifies multiple portions of the materialized view, then the query optimizer determines whether each identified portion is current or whether all identified portions were current at the same time.

For example, if all portions are stale to the same point in time and the query is associated with a "stale" mode or if all portions are fresh, then the query optimizer allows processing and execution of the query to proceed. If all portions are stale and the query is associated with a current mode, then the query optimizer does not allow the materialized view to be read in order to execute the query.

In an embodiment, if a first set of one or more identified portions of a materialized view were current at a first point in time (e.g., and are now stale) and a second set of one or more identified portions of the materialized view were current at a second point of time (e.g., and are now current), then the query optimizer may determine not to use the materialized view at all. Instead, the query optimizer causes the query (or a rewritten version) to target one or more base tables of the materialized view.

Alternatively, instead of not allowing the query to target any portion of the materialized view, the query optimizer may rewrite the query to target (1) the second set of one or more identified portions (e.g., which may be fresh) and (2) base table portion(s) that correspond to the first set of one or more identified portions. For example, in the example above, if MVP2 is fresh and MVP3 is stale, a query optimizer allows the query to target MVP2 and causes the query to also target one or more base table portions that correspond to MVP3 (if the base table portion(s) are identifiable). In this way, the query optimizer ensures that a consistent view of the database is seen at all times.

Refresh Techniques

In an embodiment, a materialized view may be refreshed using one of multiple refresh techniques. One possible refresh technique is referred to herein as "complete refresh." According to complete refresh, the defining query of a materialized view is executed against the one or more base tables upon which the materialized view is based.

For example, if a materialized view portion MVP3 is selected for refreshing and the MVP3 corresponds to base table portions BTP1 and BTP4, then a revised version of the defining query is executed against BTP1 and BTP4. Such a query may comprise the original defining query with a predicate that identifies BTP1 and BTP4.

Another possible refresh technique is referred to herein as "PCT refresh" where PCT refers to partition change tracking. In order to perform PCT refresh, one or more of the base tables of a materialized view must be partitioned. (The materialized view may or may not be partitioned.) A computer system (e.g., a database server) uses a partition change tracking mechanism to determine which base table partitions have changed since the most recent refresh of the materialized view. If portions of the materialized view can be derived based on the changed base table partitions, then only those portions of the materialized view are updated.

For example, in the case of a selective materialized view refresh using PCT refresh, if a materialized view portion MVP4 is selected for refreshing and MVP4 corresponds to base table partitions BTP7 and BTP8, then a query is executed against only BTP7 and BTP8 in order to refresh MVP4, even though other base table partitions may have been modified but whose changes are not yet reflected in any materialized view portion.

In one approach to PCT refresh, at least one of the base tables on which a materialized view is based must be physically partitioned. However, in an embodiment, none of the base tables of a materialized view need to be physically partitioned in order to perform a selective PCT refresh. Instead, at least one of the base tables is logically partitioned in order to perform a selective PCT refresh.

Another possible refresh technique is referred to herein as "log-based refresh." Log-based refresh involves the use of one or more log files that indicate changes to one or more base tables of a materialized view. For example, a log file for a base table may include a row that was inserted into the base table, include a row that was deleted from the base table, and a row that was modified in the base table. Additionally or alternatively, for a deletion, a log file may identify a row (e.g., by row number) in the base table that was deleted; for an update, a log file may identify a row (e.g., by row number) and a column that was changed, and include an updated value for the modified data item. The one or more log files are applied to the materialized view to generate an updated materialized view.

For example, in the case of a selective materialized view refresh using log-based refresh, if a materialized view portion MVP4 is selected for refreshing and MVP4 corresponds to base table portion BTP2, then a log file that stores changes to base table BT are analyzed to identify a subset of the changes that correspond to BTP2. Such an analysis may involve, for each log entry, determining whether a data item (e.g., row) identified in the log entry satisfies a predicate that corresponds to MVP4. The changes in the identified subset are then applied to MVP4, even though the log file contains other changes that are not yet reflected in any materialized view portion.

In-Place V. Out-of-Place Refresh

Each of the above refresh techniques may be performed in one of multiple ways. One possible way is referred to herein as "in-place materialized view refresh." According to in-place refresh, the materialized view that is subject to the refresh is updated directly. Another possible way to perform a refresh is referred to herein as "out-of-place materialized view refresh." According to out-of-place refresh, a separate database object is created (referred to as an "outside table") and "fresh" materialized view data is inserted into the database object. After the database object reflects a "fresh" materialized view, the database object is made accessible for query processing. In this way, the original materialized view may remain available for query processing while the database object is being populated with "fresh" data. Additional details about the out-of-place refresh technique are found in co-pending U.S. patent application Ser. No. 13/826,726.

Different Refresh Techniques

In an embodiment, during a single refresh operation, different portions of a materialized view are refreshed using different refresh techniques. For example, a first portion of a materialized view may be refreshed using a PCT refresh technique while a second portion of the materialized view may be refreshed using a log-based refresh technique.

This embodiment is not limited to selective materialized view refresh. Thus, using different refresh techniques on different portions of a materialize view may be performed during a non-selective materialized view refresh.

Failure During Refresh

In some situations during a refresh operation, the refresh operation may fail for any number of reasons, such as running out of memory and termination by a user, whether intentionally due to long execution time or by accident. Typically, such a failure results in no portion of a materialized view being updated, even if the failure occurred at the end of the refresh when most of the materialized view has been updated.

In an embodiment, the entirety of the changes that occur during a refresh operation are not rolled back in case the refresh operation fails to complete. Instead, it is determined whether any portions of the materialized view have been fully refreshed. For example, a materialized view may be partitioned into at least partitions MVP1, MVP2, MVP3, and MVP4. During a refresh operation that targets those four partitions, MVP1 and MVP2 were refreshed but a failure occurred during refresh of MVP3 and before any portion of MVP4 could be refreshed. In this example, the changes to MVP1 and MVP2 are persisted and only the changes made to MVP3 may be rolled back. A subsequent refresh of the materialized view might only refresh MVP3 and MVP4. Further, once MVP1 and MVP2 are refreshed (despite being refreshed during a failed refresh operation), MVP1 and MVP2 are immediately available for query processing, such as query rewrite and direct access.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
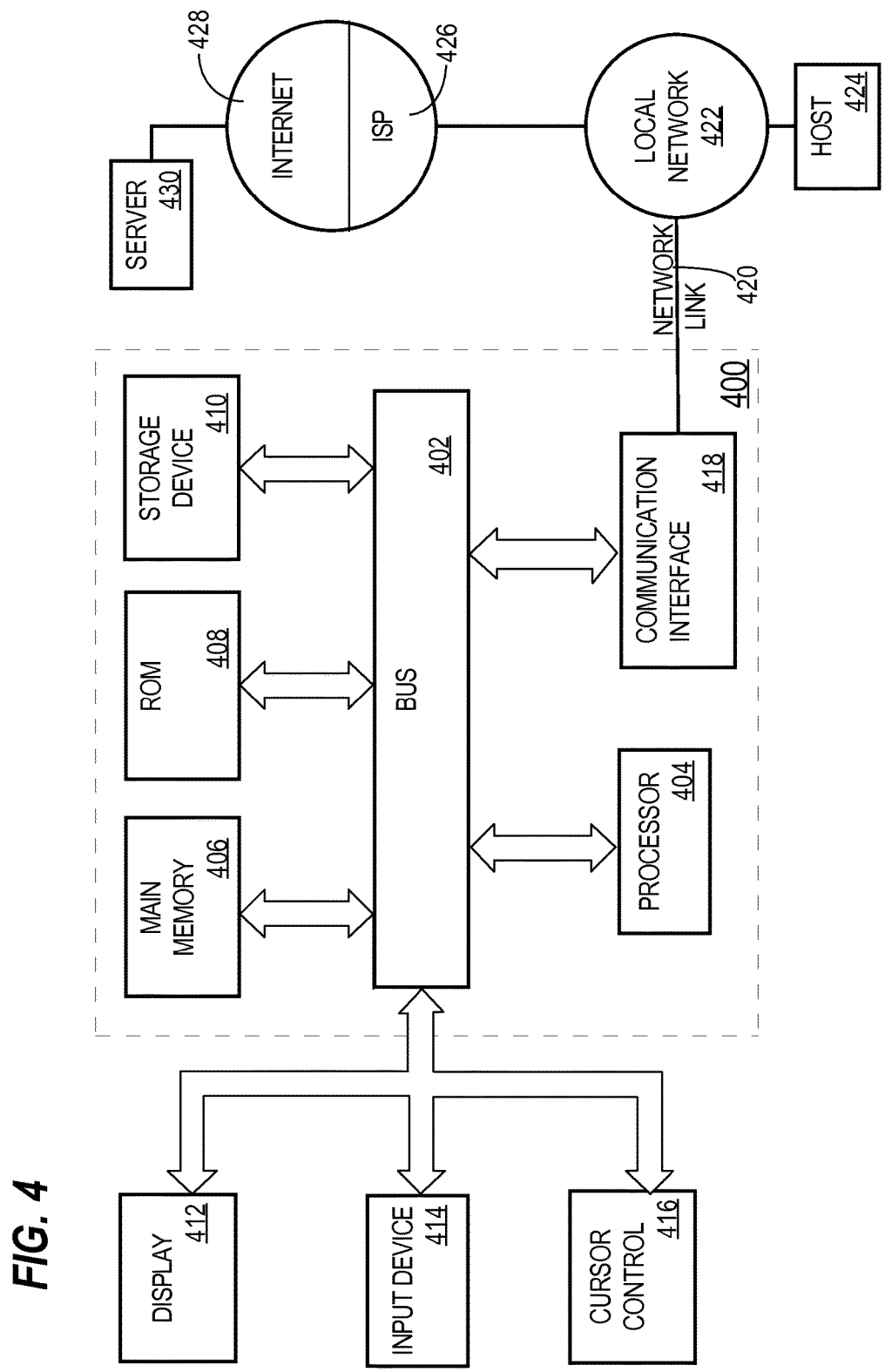
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when
    executed by one or more processors, cause:
    determining to perform a refresh operation with respect to a materialized view that is associated with one or more base tables and that comprises a plurality of portions that includes a first portion and a second portion that is different than the first portion;
    identifying change data that indicates information about changes to the one or more base tables;
    wherein the change data indicates:
        (1) for the first portion, a first number of changes to the one or more base tables or a first number of data items, in the one or more base tables, that were changed, and
        (2) for the second portion, a second number of changes to the one or more base tables or a second number of data items, in the one or more base tables, that were changed;
    wherein the changes affect the first portion of the materialized view and the second portion of the materialized view;
    wherein determining to perform the refresh operation is based on the change data;
    based on (1) the first number of changes or the first number of data items and (2) the second number of changes or the second number of data items, identifying the first portion but not the second portion for updating, wherein the first portion corresponds to one or more first portions of the one or more base tables that are associated with the materialized view;
    wherein the second portion corresponds to one or more second portions of the one or more base tables that are associated with the materialized view;
    wherein the one or more first portions include first changes that are not yet reflected in the materialized view and the one or more second portions include second changes that are not yet reflected in the materialized view;
    in response to determining to perform the refresh operation to update the materialized view, performing the refresh operation by updating the first portion of the materialized view without updating the second portion of the materialized view,
    wherein, after the refresh operation is performed, the second changes that are included in the one or more second portions before the refresh operation are not reflected in the materialized view.

2. The one or more storage media of claim 1, wherein the instructions, when executed by the one or more processors, further cause:
    identifying read data that indicates information about one or more reads to each portion of the plurality of portions;
    wherein identifying the first portion is also based on the read data.

3. The one or more storage media of claim 1, wherein the instructions, when executed by the one or more processors, further cause:
    receiving, from a user, input that indicates a particular portion of the materialized view;
    wherein determining to update is performed in response to receiving the input.

4. The one or more storage media of claim 3, wherein the first portion is a partition of the materialized view or a portion, of the materialized view, that is defined by a predicate and that does not correspond to only a single partition of the materialized view.

5. The one or more storage media of claim 3, wherein:
    the instructions, when executed by the one or more processors, further cause causing, to be communicated, data that indicates a recommendation of which portion of the materialized view to update first relative to other portions of the materialized view;
    the data indicates the first portion;
    causing is performed prior to receiving the input.

6. The one or more storage media of claim 3, wherein:
    the input indicates a plurality of distinct portions of the materialized view;
    the plurality of distinct portions at least includes the first portion and a third portion;
    the instructions, when executed by the one or more processors, further cause:
        determining, based on one or more criteria, which distinct portion of the plurality of distinct portions to update first;
        determining to update the first portion prior to updating the third portion;
    updating the first portion comprises updating the first portion prior to updating the third portion.

7. The one or more storage media of claim 6, wherein the one or more criteria indicates an amount of activity related to one or more portions of the one or more base tables that are associated with the materialized view.

8. The one or more storage media of claim 1, wherein the first portion is a partition of the materialized view.

9. The one or more storage media of claim 8, wherein the partition is a logical partition and is not related to physical properties of the materialized view.

10. The one or more storage media of claim 8, wherein the partition is a physical partition and is one of a plurality of partitions of the materialized view.

11. The one or more storage media of claim 1, wherein the instructions, when executed by the one or more processors, further cause:
    determining an access frequency of each portion of the plurality of portions of the materialized view;

causing, to be communicated, data that indicates, for each portion of the plurality of portions, the access frequency for said each portion;
receiving input that selects at least one of the plurality of portions.

12. The one or more storage media of claim 1, wherein updating the first portion of the materialized view comprises:
determining a revised version of a defining query that, when executed, causes the materialized view to be generated based on the one or more base tables, wherein the revised version of the defining query includes a predicate that corresponds to the first portion, wherein the defining query does not include the predicate;
executing the revised version of the defining query against the one or more base tables to generate results that are used to update the first portion of the materialized view.

13. The one or more storage media of claim 1, wherein:
at least one base table of the one or more base tables comprises a plurality of partitions;
updating the first portion of the materialized view comprises executing a query that targets only a strict subset of the plurality of partitions;
executing the query causes results to be returned;
the results are used to update the first portion of the materialized view.

14. The one or more storage media of claim 1, wherein updating the first portion of the materialized view comprises:
identifying, in a log file that is associated with a base table of the one or more base tables, a plurality of log entries, each of which corresponds to a change to the base table;
determining that a first strict subset of the plurality of log entries corresponds to the first portion of the materialized view, wherein a second strict subset of the plurality of log entries do not correspond to the first portion of the materialized view;
applying changes reflected in the log entries of the first strict subset to the first portion of the materialized view without applying changes reflected in the second strict subset to the first portion of the materialized view.

15. One or more storage media storing instructions which, when executed by one a particular or more processors, cause:
determining to perform a refresh operation with respect to a materialized view that is based on one or more base tables and that comprises a plurality of portions that includes a first portion and a second portion;
receiving user input that explicitly specifies the first portion of the materialized view, wherein the user input does not specify one or more other portions in the plurality of portions and the user input does not specify any of the one or more base tables;
in response to determining to perform the refresh operation and based on the user input:
identifying a certain portion, of the one or more base tables, that corresponds to the first portion of the materialized view;
wherein the certain portion that corresponds to the first portion of the materialized view includes first changes that are not yet reflected in the materialized view;
wherein another portion, of the one or more base tables, that corresponds to the second portion of the materialized view includes second changes that are not yet reflected in the materialized view;
updating the first portion of the materialized view based on the certain portion without updating any of the one or more other portions of the materialized view;
after performing the refresh operation, the one or more other portions of the materialized view are not refreshed.

16. The one or more storage media of claim 15, further comprising, prior to receiving the user input and prior to updating the first portion:
determining, based on one or more criteria, the one or more other portions, of the materialized view, that are included in the plurality of portions and that are different than the first portion;
causing, to be displayed on a display screen, information about the first portion and the one or more other portions;
wherein the user input indicates user selection of the first portion.

17. The one or more storage media of claim 15, wherein identifying the certain portion is performed based on change data that indicates information about changes made to different portions of the one or more base tables.

18. The one or more storage media of claim 15, wherein identifying the certain portion is performed based on read data that indicates information about reads made to different portions of the plurality of portions of the materialized view.

19. A method comprising:
determining to perform a refresh operation with respect to a materialized view that is associated with one or more base tables and that comprises a plurality of portions that includes a first portion and a second portion that is different than the first portion;
identifying change data that indicates information about changes to the one or more base tables;
wherein the change data indicates:
(1) for the first portion, a first number of changes to the one or more base tables or a first number of data items, in the one or more base tables, that were changed, and
(2) for the second portion, a second number of changes to the one or more base tables or a second number of data items, in the one or more base tables, that were changed;
wherein the changes affect the first portion of the materialized view and the second portion of the materialized view;
wherein determining to perform the refresh operation is based on the change data;
based on (1) the first number of changes or the first number of data items and (2) the second number of changes or the second number of data items, identifying the first portion but not the second portion for updating, wherein the first portion corresponds to one or more first portions of the one or more base tables that are associated with the materialized view;
wherein the second portion corresponds to one or more second portions of the one or more base tables that are associated with the materialized view;
wherein the one or more first portions include first changes that are not yet reflected in the materialized view and the one or more second portions include second changes that are not yet reflected in the materialized view;
in response to determining to perform the refresh operation to update the materialized view, performing the refresh operation by updating the first portion of the materialized view without updating the second portion of the materialized view, wherein, after the refresh operation is performed, the second changes that are included in the one or more second portions before the refresh operation are not reflected in the materialized view.

20. The one or more storage media of claim 1, wherein:

identifying the change data comprises identifying the change data and read data that indicates information about one or more reads to each portion of the plurality of portions;

determining to perform the refresh operation is based on the change data and the read data.

21. The one or more storage media of claim 15, wherein the instructions, when executed by the one or more processors, further cause:

storing change data that indicates information about changes to the one or more base tables;

storing read data that indicates information about one or more reads to each portion of the plurality of portions;

prior to receiving the user input:

analyzing the change data and the read data to determine a ranking of the plurality of portions;

causing data that identifies each portion of the plurality of portions to be displayed in an order that is based on the ranking.

\* \* \* \* \*

UNITED STATES PATENT AND TRADEMARK OFFICE
CERTIFICATE OF CORRECTION

PATENT NO. : 10,120,899 B2
APPLICATION NO. : 13/826501
DATED : November 6, 2018
INVENTOR(S) : Ding et al.

Page 1 of 1

It is certified that error appears in the above-identified patent and that said Letters Patent is hereby corrected as shown below:

In the Claims

In Column 17, Line 44, in Claim 15, after "one" delete "a particular".

Signed and Sealed this
Twenty-ninth Day of October, 2019

Andrei Iancu
*Director of the United States Patent and Trademark Office*